US010923107B2

(12) United States Patent
Clark et al.

(10) Patent No.: US 10,923,107 B2
(45) Date of Patent: Feb. 16, 2021

(54) CLOCKWORK HIERARCHICAL VARIATIONAL ENCODER

(71) Applicant: Google LLC, Mountain View, CA (US)

(72) Inventors: Robert Clark, Mountain View, CA (US); Chun-an Chan, Mountain View, CA (US); Vincent Wan, London (GB)

(73) Assignee: Google LLC, Mountain View, CA (US)

(*) Notice: Subject to any disclaimer, the term of this patent is extended or adjusted under 35 U.S.C. 154(b) by 129 days.

(21) Appl. No.: 16/382,722

(22) Filed: Apr. 12, 2019

(65) Prior Publication Data

US 2019/0348020 A1  Nov. 14, 2019

Related U.S. Application Data

(60) Provisional application No. 62/670,384, filed on May 11, 2018.

(51) Int. Cl.
*G10L 13/10* (2013.01)
*G10L 13/047* (2013.01)

(52) U.S. Cl.
CPC ............ *G10L 13/10* (2013.01); *G10L 13/047* (2013.01)

(58) Field of Classification Search
CPC .............................. G10L 13/10; G10L 13/047
USPC ........................................................ 704/259
See application file for complete search history.

(56) References Cited

U.S. PATENT DOCUMENTS

| 10,366,165 | B2* | 7/2019 | Devkar | G06F 40/30 |
| 2018/0096677 | A1 | 4/2018 | Pollet et al. | |
| 2020/0074985 | A1* | 3/2020 | Clark | G10L 25/18 |

FOREIGN PATENT DOCUMENTS

WO    2018067547 A1    4/2018

OTHER PUBLICATIONS

Yuxuan Wang et al : "Style Tokens: Unsupervi sed Styl e Model i ng, Control and Transfer i n End-to-End Speech Synthesis", A RXIV.O RG, Cornell Univ Ersity Library, 201 Olin Library Cornell University Ithaca, NY 14853, Mar. 24, 2018(Mar. 24, 2018), XP080862481, section 2.2 and section 6.1.

(Continued)

*Primary Examiner* — Susan I McFadden
(74) *Attorney, Agent, or Firm* — Honigman LLP; Brett A. Krueger

(57) ABSTRACT

A method for representing an intended prosody in synthesized speech includes receiving a text utterance having at least one word, and selecting an utterance embedding for the text utterance. Each word in the text utterance has at least one syllable and each syllable has at least one phoneme. The utterance embedding represents an intended prosody. For each syllable, using the selected utterance embedding, the method also includes: predicting a duration of the syllable by encoding linguistic features of each phoneme of the syllable with a corresponding prosodic syllable embedding for the syllable; predicting a pitch contour of the syllable based on the predicted duration for the syllable; and generating a plurality of fixed-length predicted pitch frames based on the predicted duration for the syllable. Each fixed-length predicted pitch frame represents part of the predicted pitch contour of the syllable.

26 Claims, 9 Drawing Sheets

(56) References Cited

OTHER PUBLICATIONS

Vincent Wan et al : "Google's Next-Generation Real-Time Unit-Selecti on Synthesizer Using Sequence-to-Sequence LSTM-Based Autoencoders", INTERSPEECH 2017, Jan. 1, 2017 (Jan. 1, 2017), pp. 1143-1147, XP055598601, ISCA DOI: 10.21437/Interspeech.2 017-1107 section 1 and section 2.
Kei Akuzawa et al : "Expressive Speech Synthesis via Modeling Expressions with Variational Autoencoder", arxiv.org, Cornell University Library, 201 Olin Library Cornell University Ithaca, NY 14853, Apr. I, 2018 (Apr. 6, 2018), XP080868156, section 3.
Sivanand Achanta et al : "Statistical Parametric Speech Synthesis Using Bottleneck Representation From Sequence Auto-encoder", arxiv.org, Cornell University Library, 201 Olin Library Cornell University Ithaca, NY 14853, Jun. 19, 2016 (Jun. 19, 2016), XP080709386.
International Search Report for the related Application No. PCT/US2019/027279 dated Jul. 11, 2019.

\* cited by examiner

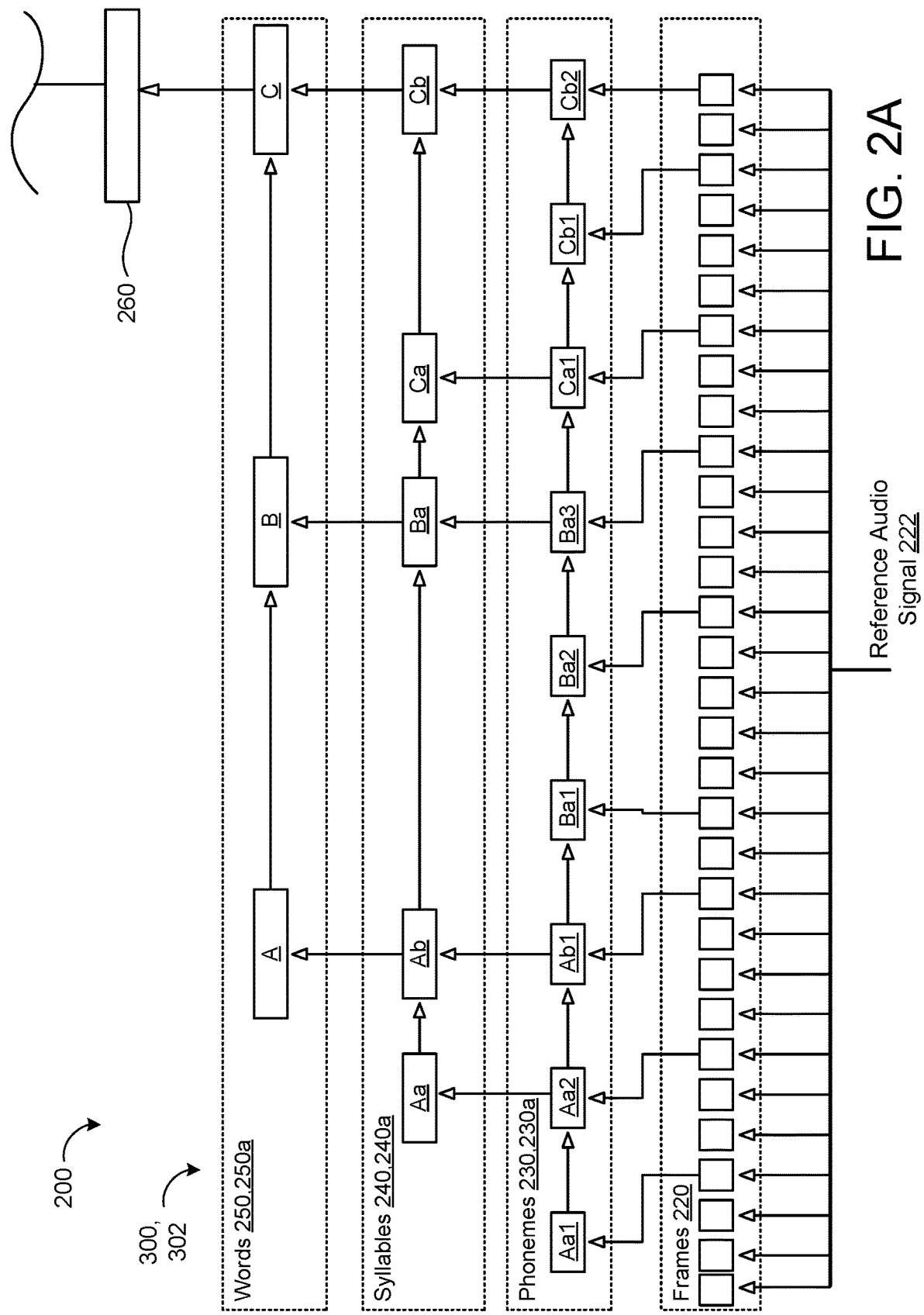

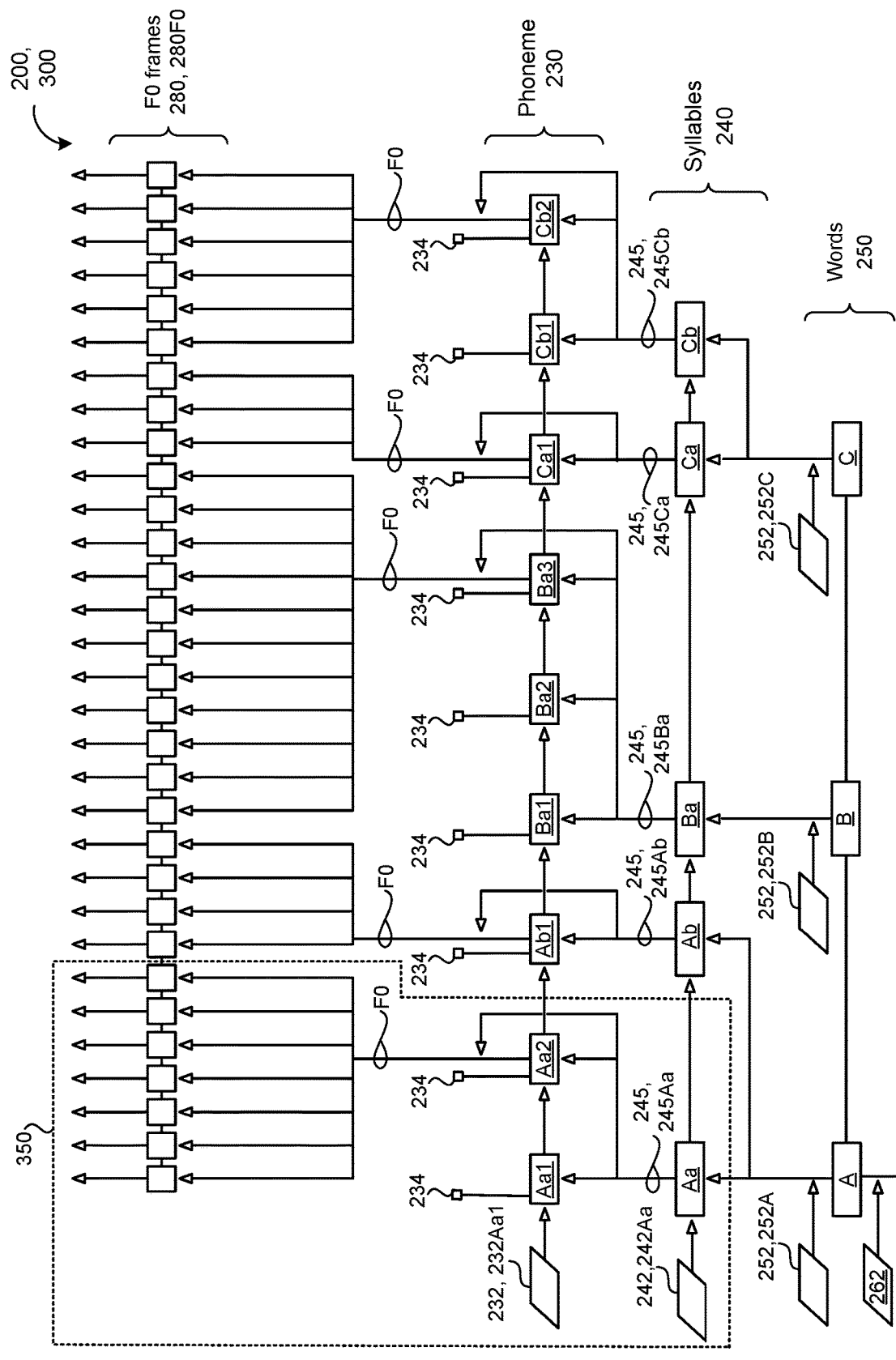

CLOCKWORK HIERARCHICAL VARIATIONAL ENCODER

CROSS REFERENCE TO RELATED APPLICATIONS

This U.S. patent application claims priority under 35 U.S.C. § 119(e) to U.S. Provisional Application 62/670,384, filed on May 11, 2018. The disclosure of this prior application is considered part of the disclosure of this application and is hereby incorporated by reference in its entirety.

TECHNICAL FIELD

This disclosure relates to a clockwork hierarchal variational encoder for predicting prosody.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models are capable of providing intelligible speech and recent advances in neural modeling of speech have significantly improved the naturalness of synthesized speech, most existing TTS models are ineffective at modeling prosody, thereby causing synthesized speech used by important applications to lack expressiveness. For instance, it is desirable for applications such as conversational assistants and long-form readers to produce realistic speech by imputing prosody features not conveyed in textual input, such as intonation, stress, and rhythm and style. For example, a simple statement can be spoken in many different ways depending on whether the statement is a question, an answer to a question, there is uncertainty in the statement, or to convey any other meaning about the environment or context which is unspecified by the input text.

SUMMARY

One aspect of the disclosure provides a method of representing an intended prosody in synthesized speech. The method includes receiving, at data processing hardware, a text utterance having at least one word, and selecting, by the data processing hardware, an utterance embedding for the text utterance. Each word in the text utterance has at least one syllable and each syllable has at least one phoneme. The utterance embedding represents an intended prosody. For each syllable, using the selected utterance embedding, the method also includes: predicting, by the data processing hardware, a duration of the syllable by encoding linguistic features of each phoneme of the syllable with a corresponding prosodic syllable embedding for the syllable; predicting, by the data processing hardware, a pitch contour of the syllable based on the predicted duration for the syllable; and generating, by the data processing hardware, a plurality of fixed-length predicted pitch frames based on the predicted duration for the syllable. Each fixed-length predicted pitch frame represents part of the predicted pitch contour of the syllable.

Implementations of the disclosure may include one or more of the following optional features. In some implementations, a network representing a hierarchical linguistic structure of the text utterance includes a first level including each syllable of the text utterance, a second level including each phoneme of the text utterance, and a third level including each fixed-length predicted pitch frame for each syllable of the text utterance. In these implementations, the first level of the network may include a long short-term memory (LSTM) processing cell representing each syllable of the text utterance, the second level of the network may include a LSTM processing cell representing each phoneme of the text utterance, and the third level of the network may include a LSTM processing cell representing each fixed-length predicted pitch frame. Here, the LSTM processing cells of the second level clock relative to and faster than the LSTM processing cells of the first level, while the LSTM processing cells of the third level clock relative to and faster than the LSTM processing cells of the second level.

In some examples, predicting the duration of the syllable includes: for each phoneme associated with the syllable, predicting a duration of the corresponding phoneme by encoding the linguistic features of the corresponding phoneme with the corresponding prosodic syllable embedding for the syllable; and determining the duration of the syllable by summing the predicted durations for each phoneme associated with the syllable. In these examples, predicting the pitch contour of the syllable based on the predicted duration for the syllable may include combining the corresponding prosodic syllable embedding for the syllable with each encoding of the corresponding prosodic syllable embedding and the phone-level linguistic features of each corresponding phoneme associated with the syllable.

In some implementations, the method also includes, for each syllable, using the selected utterance embedding: predicting, by the data processing hardware, an energy contour of each phoneme in the syllable based on a predicted duration for the phoneme; and for each phoneme associated with the syllable, generating, by the data processing hardware, a plurality of fixed-length predicted energy frames based on the predicted duration for the phoneme. Here, each fixed-length energy frame represents the predicted energy contour of the corresponding phoneme. In these implementations, a hierarchical linguistic structure represents the text utterance and the hierarchical linguistic structure includes a first level including each syllable of the text utterance, a second level including each phoneme of the text utterance, a third level including each fixed-length predicted pitch frame for each syllable of the text utterance, and a fourth level parallel to the third level and including each fixed-length predicted energy frame for each phoneme of the text utterance. The first level may include a long short-term memory (LSTM) processing cell representing each syllable of the text utterance, the second level may include a LSTM processing cell representing each phoneme of the text utterance, the third level may include a LSTM processing cell representing each fixed-length predicted pitch frame, and the fourth level may include a LSTM processing cell representing each fixed-length predicted energy frame. Here, the LSTM processing cells of the second level clock relative to and faster than the LSTM processing cells of the first level, the LSTM processing cells of the third level clock relative to and faster than the LSTM processing cells of the second level, and the LSTM processing cells of the fourth level clock at the same speed as the LSTM processing cells of the third level and clock relative to and faster than the LSTM processing cells of the second level.

In some examples, the third level of the hierarchical linguistic structure includes a feed-forward layer that predicts the predicted pitch frames for each syllable in a single pass and/or the fourth level of the hierarchical linguistic structure includes a feed-forward layer that predicts the predicted energy frames for each phoneme in a single pass. Moreover, the lengths of the fixed-length predicted energy frames and the fixed-length predicted pitch frames may be the same. Additionally or alternatively, a total number of fixed-length predicted energy frames generated for each phoneme of the received text utterance may be equal to a total number of the fixed-length predicted pitch frames generated for each syllable of the received text utterance.

In some implementations, the method also includes: receiving, by the data processing hardware, training data including a plurality of reference audio signals, each reference audio signal including a spoken utterance of human speech and having a corresponding prosody; and training, by the data processing hardware, a deep neural network for a prosody model by encoding each reference audio signal into a corresponding fixed-length utterance embedding representing the corresponding prosody of the reference audio signal. The utterance embedding may include a fixed-length numerical vector.

Another aspect of the disclosure provides a system for representing an intended prosody in synthesized speech. The system includes data processing hardware and memory hardware in communication with the data processing hardware. The memory hardware stores instructions that when executed on the data processing hardware cause the data processing hardware to perform operations. The operations include receiving a text utterance having at least one word, and selecting an utterance embedding for the text utterance. Each word in the text utterance has at least one syllable and each syllable has at least one phoneme. The utterance embedding represents an intended prosody. For each syllable, using the selected utterance embedding, the operations also include: predicting a duration of the syllable by encoding linguistic features of each phoneme of the syllable with a corresponding prosodic syllable embedding for the syllable; predicting a pitch contour of the syllable based on the predicted duration for the syllable; and generating a plurality of fixed-length predicted pitch frames based on the predicted duration for the syllable. Each fixed-length predicted pitch frame represents part of the predicted pitch contour of the syllable.

This aspect may include one or more of the following optional features. In some implementations, a network representing a hierarchical linguistic structure of the text utterance includes a first level including each syllable of the text utterance, a second level including each phoneme of the text utterance, and a third level including each fixed-length predicted pitch frame for each syllable of the text utterance. In these implementations, the first level of the network may include a long short-term memory (LSTM) processing cell representing each syllable of the text utterance, the second level of the network may include a LSTM processing cell representing each phoneme of the text utterance, and the third level of the network may include a LSTM processing cell representing each fixed-length predicted pitch frame. Here, the LSTM processing cells of the second level clock relative to and faster than the LSTM processing cells of the first level, while the LSTM processing cells of the third level clock relative to and faster than the LSTM processing cells of the second level.

In some examples, predicting the duration of the syllable includes: for each phoneme associated with the syllable, predicting a duration of the corresponding phoneme by encoding the linguistic features of the corresponding phoneme with the corresponding prosodic syllable embedding for the syllable; and determining the duration of the syllable by summing the predicted durations for each phoneme associated with the syllable. In these examples, predicting the pitch contour of the syllable based on the predicted duration for the syllable may include combining the corresponding prosodic syllable embedding for the syllable with each encoding of the corresponding prosodic syllable embedding and the phone-level linguistic features of each corresponding phoneme associated with the syllable.

In some implementations, the operations also include, for each syllable, using the selected utterance embedding: predicting an energy contour of each phoneme in the syllable based on a predicted duration for the phoneme; and for each phoneme associated with the syllable, generating a plurality of fixed-length predicted energy frames based on the predicted duration for the phoneme. Here, each fixed-length energy frame represents the predicted energy contour of the corresponding phoneme. In these implementations, a hierarchical linguistic structure represents the text utterance and the hierarchical linguistic structure includes a first level including each syllable of the text utterance, a second level including each phoneme of the text utterance, a third level including each fixed-length predicted pitch frame for each syllable of the text utterance, and a fourth level parallel to the third level and including each fixed-length predicted energy frame for each phoneme of the text utterance. The first level may include a long short-term memory (LSTM) processing cell representing each syllable of the text utterance, the second level may include a LSTM processing cell representing each phoneme of the text utterance, the third level may include a LSTM processing cell representing each fixed-length predicted pitch frame, and the fourth level may include a LSTM processing cell representing each fixed-length predicted energy frame. Here, the LSTM processing cells of the second level clock relative to and faster than the LSTM processing cells of the first level, the LSTM processing cells of the third level clock relative to and faster than the LSTM processing cells of the second level, and the LSTM processing cells of the fourth level clock at the same speed as the LSTM processing cells of the third level and clock relative to and faster than the LSTM processing cells of the second level.

In some examples, the third level of the hierarchical linguistic structure includes a feed-forward layer that predicts the predicted pitch frames for each syllable in a single pass and/or the fourth level of the hierarchical linguistic structure includes a feed-forward layer that predicts the predicted energy frames for each phoneme in a single pass. Moreover, the lengths of the fixed-length predicted energy frames and the fixed-length predicted pitch frames may be the same. Additionally or alternatively, a total number of fixed-length predicted energy frames generated for each phoneme of the received text utterance may be equal to a total number of the fixed-length predicted pitch frames generated for each syllable of the received text utterance.

In some implementations, the operations also includes: receiving training data including a plurality of reference audio signals, each reference audio signal including a spoken utterance of human speech and having a corresponding prosody; and training a deep neural network for a prosody model by encoding each reference audio signal into a corresponding fixed-length utterance embedding representing the corresponding prosody of the reference audio signal. The utterance embedding may include a fixed-length numerical vector.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of a hierarchical linguistic structure for encoding prosody of a reference audio signal into a fixed-length utterance embedding.

FIGS. 3A and 3B are schematic views of an example autoencoder for predicting duration and pitch contours for each syllable of a text utterance.

Like reference symbols in the various drawings indicate like elements.

DETAILED DESCRIPTION

Figure 1:
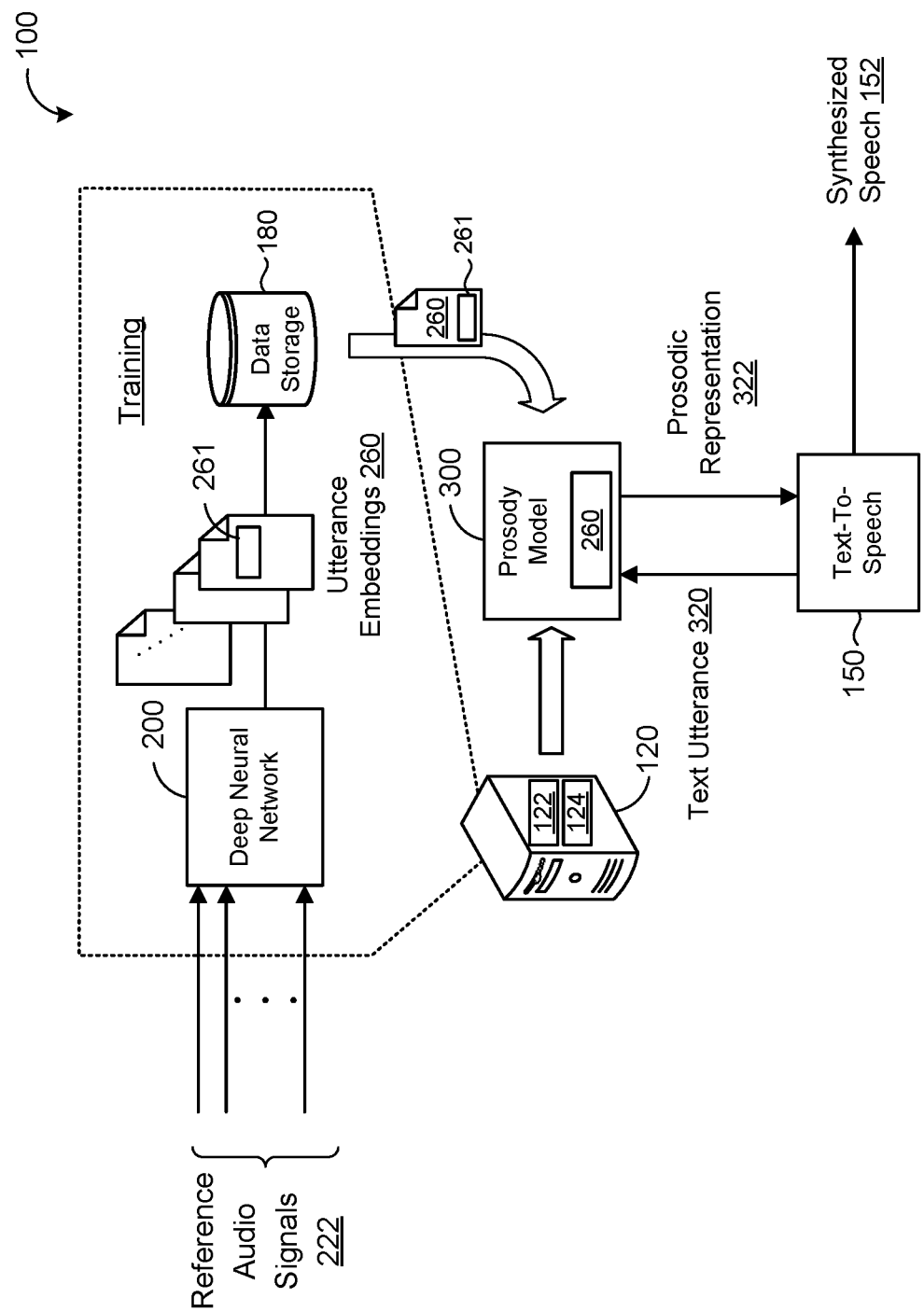
FIG. 1 is a schematic view of an example system for training a deep neural network to provide a controllable prosody model for use in predicting a prosodic representation for a text utterance.

Text-to-speech (TTS) models, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of the speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. Accordingly, a given text input that is associated with a high degree of prosodic variation can produce synthesized speech with local changes in pitch and speaking duration to convey different semantic meanings, and also with global changes in the overall pitch trajectory to convey different moods and emotions.

Neural network models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding. Implementations herein are directed toward a neural network model that includes a variational autoencoder (VAE) having an encoder portion for encoding a reference audio signal corresponding to a spoken utterance into an utterance embedding that represents the prosody of the spoken utterance, and a decoder portion that decodes the utterance embedding to predict durations of phonemes and pitch and energy contours for each syllable.

The encoder portion may train utterance embeddings representing prosody by encoding numerous reference audio signals conditioned on linguistic features representing the utterances. The linguistic features may include, without limitation, individual sounds for each phoneme, whether each syllable is stressed or un-stressed, the type of each word (e.g., noun/adjective/verb) and/or the position of the word in the utterance, and whether the utterance is a question or phrase. Each utterance embedding is represented by a fixed-length numerical vector. In some implementations, the fixed-length numerical vector includes a value equal to 256. However, other implementations may use fixed-length numerical vectors having values greater than or less than 256. The decoder portion may decode a fixed-length utterance embedding into a sequence of phoneme durations via a first decoder and into a sequence of fixed-length frames (e.g., five millisecond) of pitch and energy using the phoneme durations. During training, the phoneme durations and fixed-length frames of pitch and energy predicted by the decoder portion closely match the phoneme durations and fixed-length frames of pitch and energy sampled from the reference audio signal associated with the fixed-length utterance embedding.

The VAE of the present disclosure includes a Clockwork Hierarchal Variational Autoencoder (CHiVE) that incorporates hierarchical stacked layers of long-short term-memory (LSTM) cells, with each layer of LSTM cells incorporating structure of the utterance such that one layer represents phonemes, a next layer represents syllables, and another layer represents words. Moreover, the hierarchy of stacked layers of LSTM cells are variably clocked to a length of hierarchical input data. For instance, if the input data contains a word of three syllables followed by a word of four syllables, then the syllable layer of the CHiVE would clock three times relative to a single clock of the word layer for the first input word, and then the syllable layer would clock four more times relative to a subsequent single clock of the word layer for the second word. Thus, rather than using frame-based techniques where memory associated with given LSTM cell is only effective for about a half second (i.e., 100 times steps with a five (5) millisecond frame rate), and thus, only providing the LSTM cell memory for two or three syllables of speech, the phoneme, word, and syllable layers of the CHiVE clock with phonemes, words, and syllables, respectively, giving the LSTM cells of the stacked layers memory over the last 100 words, syllables, or phonemes.

During inference, the CHiVE is configured to receive a text utterance and select an utterance embedding for the text utterance. The received text utterance has at least one word, each word has at least one syllable, and each syllable has at least one phoneme. Since the text utterance is missing context, semantic information, and pragmatic information to guide the appropriate prosody for producing synthesized speech from the utterance, the CHiVE uses that selected utterance embedding as the latent variable to represent an intended prosody. Thereafter, the CHiVE uses the selected utterance embedding to predict a duration of each syllable by encoding linguistic features of each phoneme contained in the syllable with a corresponding prosodic syllable embedding for the syllable, and predict a pitch of each syllable based on the predicted duration for the syllable.

Lastly, the CHiVE is configured to generate a plurality of fixed-length pitch frames based on the predicted duration for each syllable such that each fixed-length pitch frame represents the predicted pitch of the syllable. The CHiVE may similarly predict energy (e.g., loudness) of each syllable based on the predicted duration for the syllable and generate a plurality of fixed-length energy frames each representing the predicted energy of the syllable. The fixed-length pitch and/or energy frames may be provided to a unit-selection model or wave-net model of a TTS system to produce the synthesized speech with the intended prosody provided by the input fixed-length utterance embedding.

FIG. 1 shows an example system 100 for training a deep neural network 200 to provide a controllable prosody model 300, and for predicting a prosodic representation 322 for a text utterance 320 using the prosody model 300. The system 100 includes a computing system 120 having data processing hardware 122 and memory hardware 124 in communication with the data processing hardware 122 and storing instructions that cause the data processing hardware 122 to perform operations. In some implementations, the computing system 120 (e.g., the data processing hardware 122) provides a prosody model 300 based on a trained deep neural network 200 to a text-to-speech (TTS) system 150 for controlling prosody of synthesized speech 152 from an input text utterance 320. Since the input text utterance 320 has no way of conveying context, semantics, and pragmatics to guide the appropriate prosody of the synthesized speech 152, the prosody model 300 may predict a prosodic representation 322 for the input text utterance 320 by conditioning the model 300 on linguistic features extracted from the text utterance 320 and using a fixed-length utterance embedding 260 as a latent variable representing an intended prosody for the text utterance 320. In some examples, the computing system 120 implements the TTS system 150. In other examples, the computing system 120 and the TTS system 150 are distinct and physically separate from one another. The computing system may include a distributed system (e.g., cloud computing environment).

In some implementations, the deep neural network 200 is trained on a large set of reference audio signals 222. Each reference audio signal 222 may include a spoken utterance of human speech recorded by a microphone and having a prosodic representation. During training, the deep neural network 200 may receive multiple reference audio signals 222 for a same spoken utterance, but with varying prosodies (i.e., the same utterance can be spoken in multiple different ways). Here, the reference audio signals 222 are of variable-length such that the duration of the spoken utterances varies even though the content is the same. The deep neural network 200 is configured to encode/compress the prosodic representation associated with each reference audio signal 222 into a corresponding fixed-length utterance embedding 260. The deep neural network 200 may store each fixed-length utterance embedding 260 in an utterance embedding storage 180 (e.g., on the memory hardware 124 of the computing system 120) along with a corresponding transcript 261 of the reference audio signal 222 associated the utterance embedding 260. The deep neural network 200 may be further trained by back-propagating the fixed-length utterance embeddings 260 conditioned upon linguistic features extracted from the transcripts 261 to generate fixed-length frames of pitch, energy, and duration of each syllable.

During inference, the computing system 120 may use the prosody model 300 to predict a prosodic representation 322 for a text utterance 320. The prosody model 300 may select an utterance embedding 260 for the text utterance 320. The utterance embedding 260 represents an intended prosody of the text utterance 320. Described in greater detail below with reference to FIGS. 2A-2C and 3A-3C, the prosody model 300 may predict the prosodic representation 322 for the text utterance 320 using the selected utterance embedding 260. The prosodic representation 322 may include predicted pitch, predicted timing, and predicted loudness (e.g., energy) for the text utterance 320. In the example shown, the TTS system 150 uses the prosodic representation 322 to produce synthesized speech 152 from the text utterance 320 and having the intended prosody.

Figure 2B:
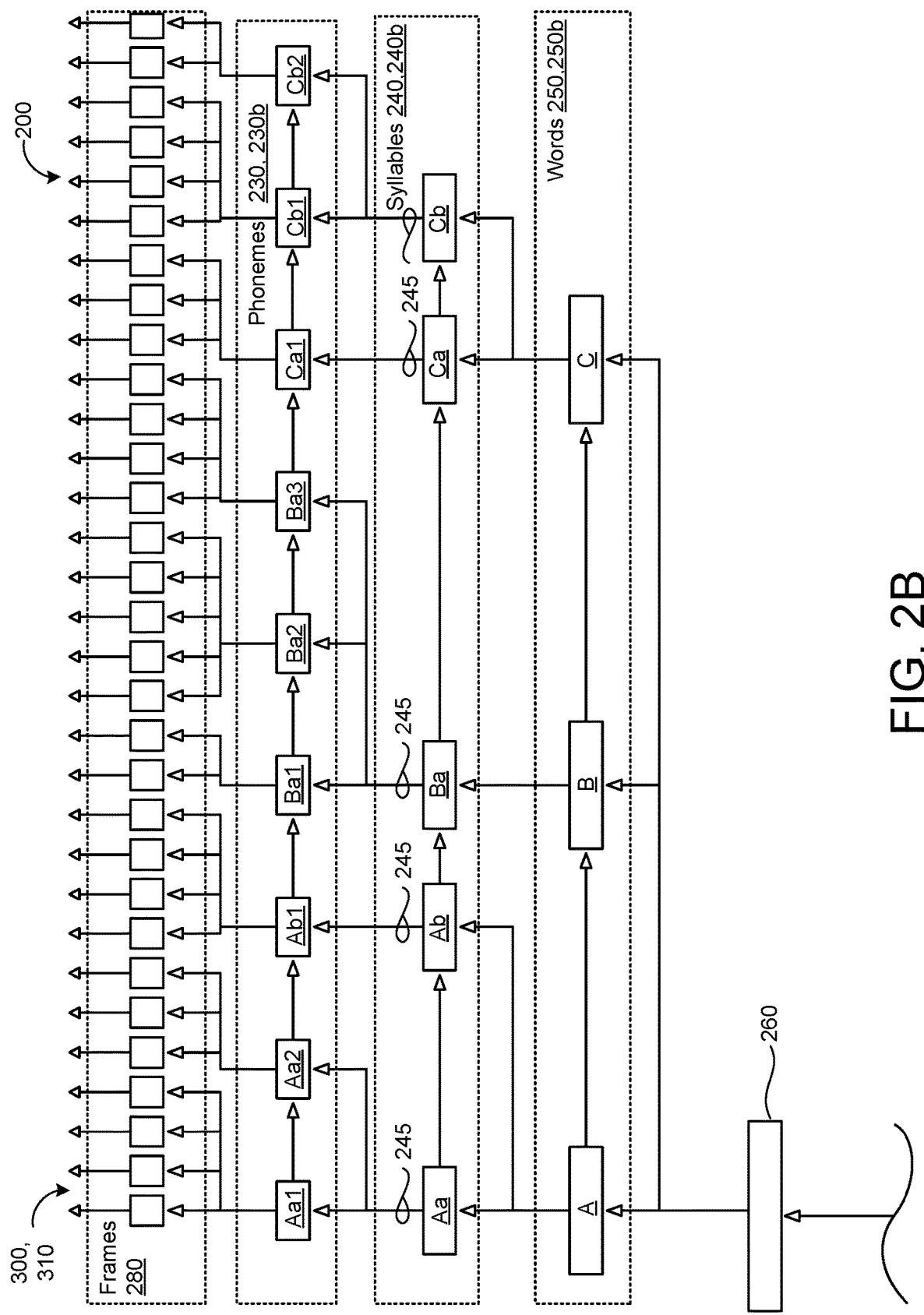
FIG. 2B is a schematic view of a hierarchical linguistic structure using a fixed-length utterance embedding to predict a prosodic representation of a text utterance.

FIGS. 2A and 2B show a hierarchical linguistic structure (e.g., deep neural network of FIG. 1) 200 for a clockwork hierarchal variational autoencoder (CHiVE) 300 ('autoencoder 300') that provides a controllable model of prosody that jointly predicts, for each syllable of given input text, a duration of all phonemes in the syllable and pitch (F0) and energy (C0) contours for the syllable without relying on any unique mappings from the given input text or other linguistic specification to produce synthesized speech 152 having an intended/selected prosody. The autoencoder 300 an encoder portion 302 (FIG. 2A) that encodes a plurality of fixed-length reference frames 220 sampled from a reference audio signal 222 into a fixed-length utterance embedding 260, and a decoder portion 310 (FIG. 2B) that learns how to decode the fixed-length utterance embedding 260 into a plurality of fixed-length predicted frames 280. As will become apparent, the autoencoder 300 is trained so that the number of predicted frames 280 output from the decoder portion 310 is equal to the number of reference frames 220 input to the encoder portion 302. Moreover, the autoencoder 300 is trained so that data associated with the reference and predicted frames 220, 280 substantially match one another.

Referring to FIG. 2A, the encoder portion 302 receives the sequence of fixed-length reference frames 220 from the input reference audio signal 222. The input reference audio signal 222 may include a spoken utterance of human speech recorded by a microphone that includes a target prosody. The encoder portion 302 may receive multiple reference audio signals 222 for a same spoken utterance, but with varying prosodies (i.e., the same utterance can be spoken in multiple different ways). For example, the same spoken utterance may vary in prosody when the spoken reference is an answer to a question compared to when the spoken utterance is a question. The reference frames 220 may each include a duration of 5 milliseconds (ms) and represent one of a contour of pitch (F0) or a contour of energy (C0) for the reference audio signal 222. In parallel, the encoder portion 302 may also receive a second sequence of reference frames 220 each including a duration of 5 ms and representing the other one of the contour of pitch (F0) or the contour of energy (C0) for the reference audio signal 222. Accordingly, the sequence reference frames 220 sampled from the reference audio signal 222 provide a duration, pitch contour, and/or energy contour to represent prosody for the reference audio signal 222. The length or duration of the reference audio signal 222 correlates to a sum of the total number of reference frames 220.

The encoder portion 302 includes hierarchical levels of reference frames 220, phonemes 230, 230a, syllables 240, 240a, and words 250, 250a for the reference audio signal 222 that clock relative to one another. For instance, the level associated with the sequence of reference frames 220 clocks faster than the next level associated with the sequence of phonemes 230. Similarly, the level associated with the sequence of syllables 240 clocks slower than the level associated with the sequence of phonemes 230 and faster than the level associated with the sequence of words 250. Accordingly, the slower clocking layers receive, as input, an output from faster clocking layers so that the output after the final clock (i.e., state) of a faster layer is taken as the input to the corresponding slower layer to essentially provide a sequence-to-sequence encoder. In the examples shown, the hierarchical levels include Long Short-Term Memory (LSTM) levels.

In some examples, the encoder portion 302 first encodes the sequence of reference frames 220 into the sequence of phonemes 230. Each phoneme 230 receives, as input, a corresponding encoding of a subset of reference frames 220 and includes a duration equal to the number of reference frames 220 in the encoded subset. In the example shown, the first four fixed-length reference frames 220 are encoded into phoneme 230Aa1; the next three fixed-length reference frames 220 are encoded into phoneme 230Aa2; the next four fixed-length reference frames 220 are encoded into phoneme 230Ab1; the next two fixed-length reference frames 220 are encoded into phoneme 230Ba1, the next five fixed-length reference frames 220 are encoded into phoneme 230Ba2; the next four fixed-length reference frames 220 are encoded into phoneme 230Ba3; the next three fixed-length reference frames 220 are encoded into phoneme 230Ca1; the next four fixed-length reference frames 220 are encoded into phoneme 230Cb1; and the final two fixed-length reference frames 220 are encoded into phoneme 230Cb2. Thus, each phoneme 230 in the sequence of phonemes 230 includes a corresponding duration based on the number of reference frames 220 encoded into the phoneme 230 and corresponding pitch and/or energy contours. For instance, phoneme 230Aa1 includes a duration equal to 20 ms (i.e., four reference frames 220 each having the fixed-length of five milliseconds) and phoneme 230Aa2 includes a duration equal to 15 ms (i.e., three reference frames 220 each having the fixed-length of five milliseconds). Thus, the level of reference frames 220 clocks a total of seven times for a single clocking between the phoneme 230Aa1 and the next phoneme 230Aa2 for the level of phonemes 230.

After encoding the fixed-length frames 220 into corresponding phonemes 230, the encoder portion 302 is further configured to encode the sequence of phonemes 230 into the sequence of syllables 240 for the reference audio signal 222. Here, each syllable 240 receives, as input, a corresponding encoding of one or more phonemes 230 and includes a duration equal to a sum of the durations for the one or more phonemes 230 of the corresponding encoding. The duration of the syllables 240 may indicate timing of the syllables 240 and pauses in between adjacent syllables 240. In the example shown, the first two phonemes 230Aa1, 230Aa2 are encoded into syllable 240Aa; the next phoneme 230Ab1 is encoded into syllable 240Ab; each of phonemes 230Ba1, 230Ba2, 230Ba3 are encoded into syllable 240Ba; phoneme 230Ca1 is encoded into syllable 240Ca; and phonemes 230Cb1, 230Cb2 are encoded into syllable 240Cb. Each syllable 240Aa-240Cb in the level of syllables 240 may correspond to a respective syllable embedding (e.g., a numerical vector) that indicates a duration, pitch (F0), and/or energy (C0) associated with the corresponding syllable 240. Moreover, each syllable is indicative of a corresponding state for the level of syllables 240. For instance, syllable 240Aa includes a duration equal to 35 ms (i.e., the sum of the 20 ms duration for phoneme 230Aa1 and the 15 ms duration for phone 230A2) and syllable 240Ab includes a duration equal to 20 ms (i.e., the 20 ms duration for phoneme 230Ab1). Thus, the level of reference frames 220 clocks a total of eleven times and the level of phonemes 230 clocks a total of three times for a single clocking between the syllable 240Aa and the next syllable 240Ab for the level of syllables 240.

With continued reference to FIG. 2A, in some implementations, the encoder portion 302 further encodes the sequence of syllables 240 into the sequence of words 250 for the reference audio signal 222. Here, syllables 240Aa, 240Ab are encoded into word 250A; syllable 240Ba is encoded into word 250B; and syllables 240Ca, 240Cb are encoded into word 250C. Finally, the encoder portion 302 encodes the sequence of words 250 into the fixed-length utterance embedding 260. The fixed-length utterance embedding 260 includes a numerical vector representing a prosody of the reference audio signal 222. In some examples, the fixed-length utterance embedding 260 includes a numerical vector having a value equal to "256". The encoder portion 302 may repeat this process for each reference audio signal 222. In some examples, the encoder portion 302 encodes a plurality of reference audio signals 222 each corresponding to a same spoken utterance/phrase but with varying prosodies, i.e., each reference audio signal 222 conveys the same utterance but is spoken differently. The fixed-length utterance embedding 260 may be stored in the data storage 180 (FIG. 1) along with a respective transcript 261 (e.g., textual representation) of the reference audio signal 222. From the transcript 261, linguistic features may be extracted and stored for use in conditioning the training of the hierarchical linguistic structure 200. The linguistic features may include, without limitation, individual sounds for each phoneme, whether each syllable is stressed or un-stressed, the type of each word (e.g., noun/adjective/verb) and/or the position of the word in the utterance, and whether the utterance is a question or phrase.

Figure 2C:
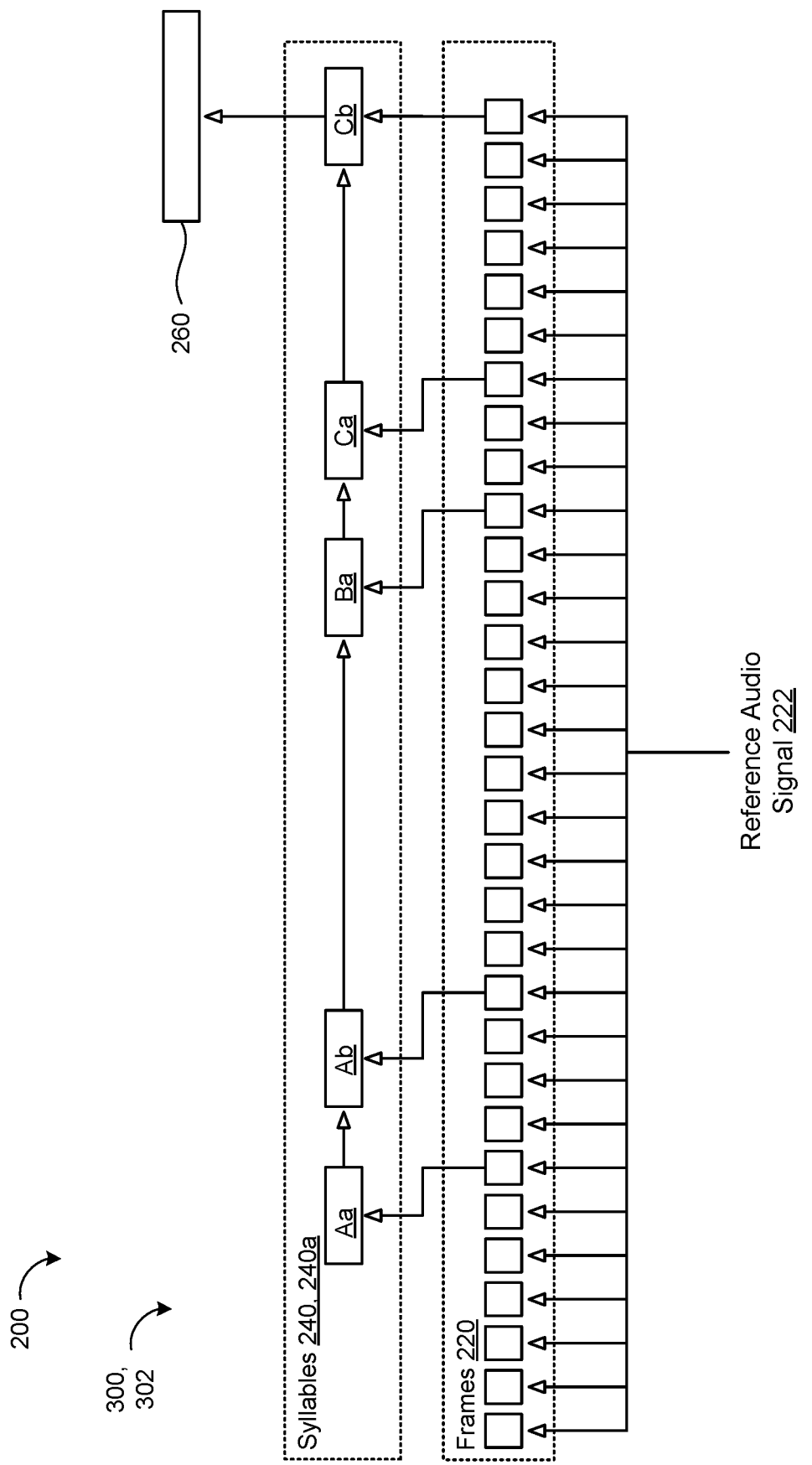
FIG. 2C is a schematic view of an encoder portion of a hierarchical linguistic structure configured to encode fixed-length reference frames directly into a fixed-length utterance embedding.

Referring to FIG. 2C, in some implementations, the hierarchical linguistic structure 200 omits the level associated with the sequence of phonemes 230 and allows the encoder portion 302 to simply encode a corresponding subset of reference frames 220 into each syllable 240 of the syllable level 240 during training. For instance, the first seven reference frames 220 may be encoded directly into syllable 240Aa without having to encode into corresponding phonemes 230Aa1, 230Aa2 (FIG. 2A) as an intermediary step. Similarly, during training, the hierarchical linguistic structure 200 may optionally omit the level associated with the sequence of words 250 and allow the encoder portion 302 to encode the sequence of syllables 240 directly into the fixed-length utterance embedding 260. In other examples, training may instead optionally include the level of associated with the sequence of phonemes 230 and allow the encoder portion 302 to simply encode a corresponding subset of reference frames 220 into each phoneme 230 of the level of phonemes 230 and then encode a corresponding subset of phonemes 230 directly into the fixed-length utterance embedding 260 without having to encode corresponding syllables 240 and/or words 250.

Referring to FIG. 2B, the decoder portion 310 of the variational autoencoder 300 is configured to produce a plurality of fixed-length syllable embeddings 245 by initially decoding a fixed-length utterance embedding 260 that represents a prosody for an utterance. During training, the utterance embedding 260 may include the utterance embedding 260 output from the encoder portion 302 of FIGS. 2A and 2C by encoding the plurality of fixed-length reference frames 220 sampled from the reference audio signal 222. Thus, the decoder portion 310 is configured to back-propagate the utterance embedding 260 during training to generate the plurality of fixed-length predicted frames 280 that closely match the plurality of fixed-length reference frames 220. For instance, fixed-length predicted frames 280 for both pitch (F0) and energy (C0) may be generated in parallel to represent a target prosody (e.g., predicted prosody) that substantially matches the reference prosody of the reference audio signal 222 input to the encoder portion 302 as training data. In some examples, a TTS system 150 (FIG. 1) uses the fixed-length predicted frames 280 to produce synthesized speech 152 with a selected prosody based on the fixed-length utterance embedding 260. For instance, a unit selection module or a WaveNet module of the TTS system 150 may use the frames 280 to produce the synthesized speech 152 having the intended prosody.

In the example shown, the decoder portion 310 decodes the utterance embedding 260 (e.g., numerical value of "256") received from the encoder portion 302 (FIG. 2A or 2C) into hierarchical levels of words 250, 250b, syllables 240, 240b, phonemes 230, 230b, and the fixed-length predicted frames 280. Specifically, the fixed-length utterance embedding 260 corresponds to a variational layer of hierarchical input data for the decoder portion 310 and each of the stacked hierarchical levels include Long Short-Term Memory (LSTM) processing cells variably clocked to a length of the hierarchical input data. For instance, the syllable level 240 clocks faster than the word level 250 and slower than the phoneme level 230. The rectangular blocks in each level correspond to LSTM processing cells for respective words, syllables, phonemes, or frames. Advantageously, the autoencoder 300 gives the LSTM processing cells of the word level 250 memory over the last 100 words, gives the LSTM cells of the syllable level 240 memory over the last 100 syllables, gives the LSTM cells of the phoneme level 230 memory over the last 100 phonemes, and gives the LSTM cells of the fixed-length pitch and/or energy frames 280 memory over the last 100 fixed-length frames 280. When the fixed-length frames 280 include a duration (e.g., frame rate) of five milliseconds each, the corresponding LSTM processing cells provide memory over the last 500 milliseconds (e.g., a half second).

In the example shown, the decoder portion 310 of the hierarchical linguistic structure 200 simply back-propagates the fixed-length utterance embedding 260 encoded by the encoder portion 302 into the sequence of three words 250A-250C, the sequence of five syllables 240Aa-240Cb, and the sequence of nine phonemes 230Aa1-230Cb2 to generate the sequence of predicted fixed-length frames 280. The decoder portion 310 is conditioned upon linguistic features of the input text. By contrast to the encoder portion 302 of FIGS. 2A and 2C where outputs from faster clocking layers are received as inputs by slower clocking layers, the decoder portion 310 includes outputs from slower clocking layers feeding faster clocking layers such that the output of a slower clocking layer is distributed to the input of the faster clocking layer at each clock cycle with a timing signal appended thereto.

Figure 3B:
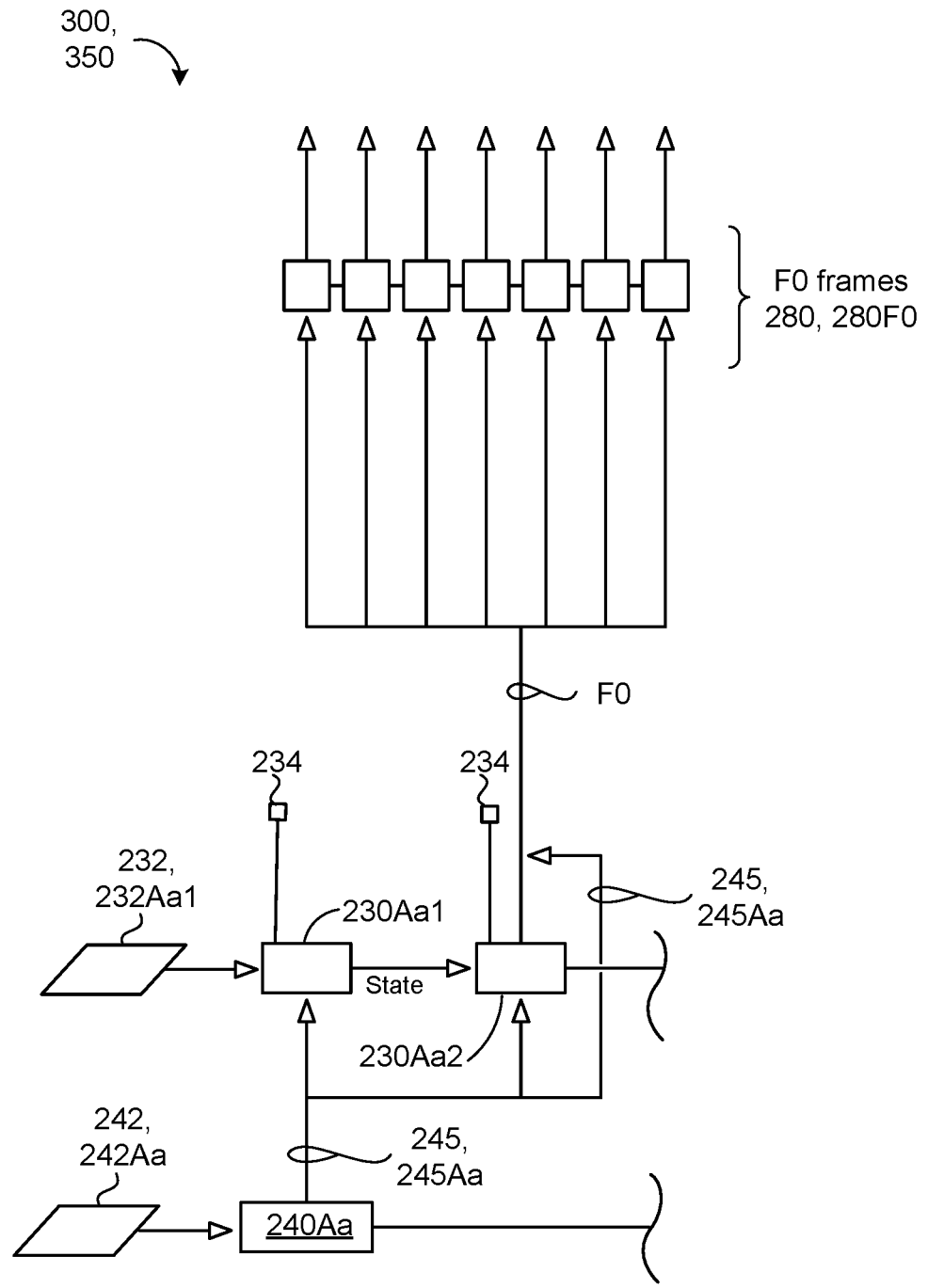
Figure 3C:
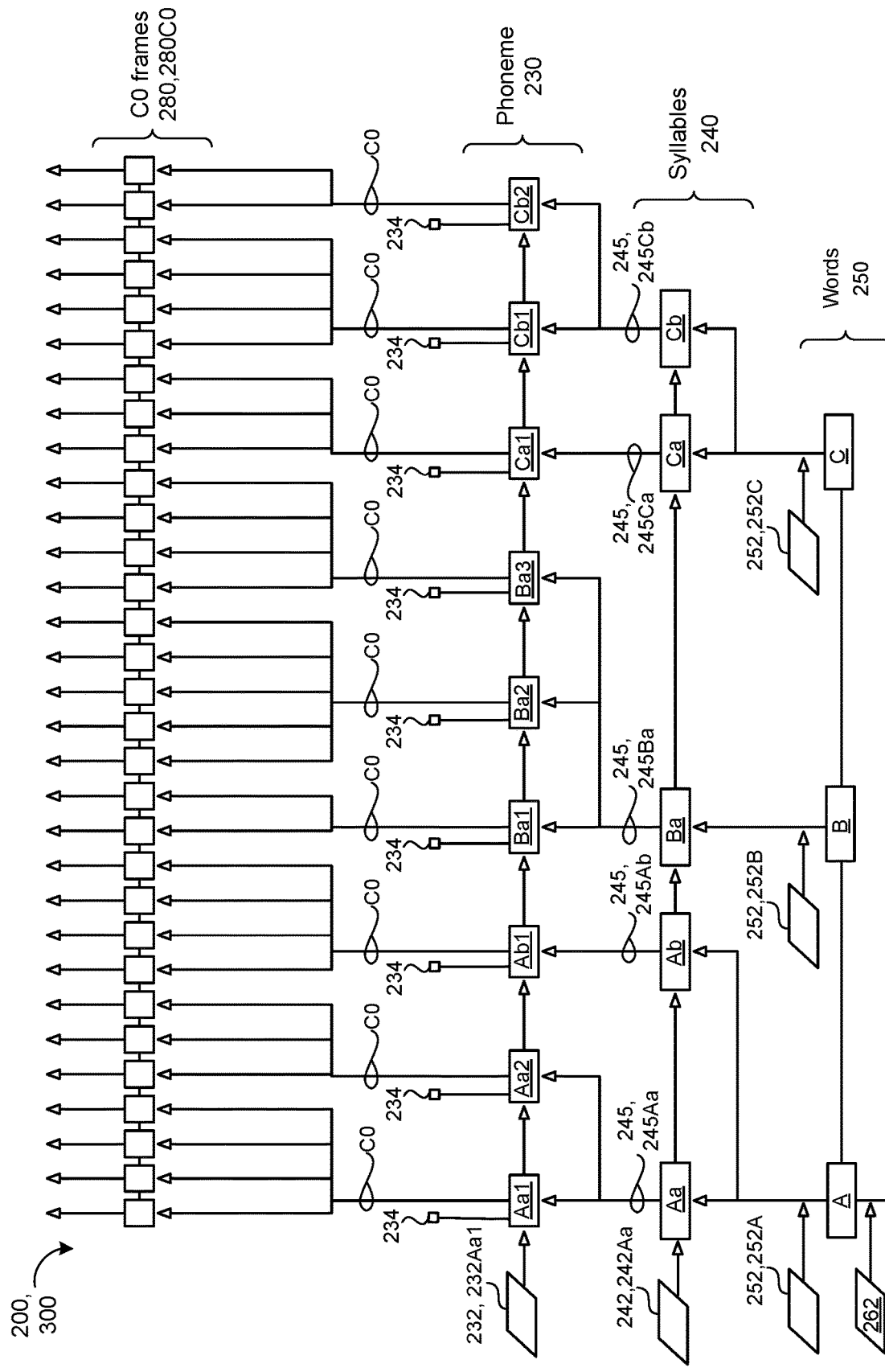
FIG. 3C is a schematic view of an example autoencoder for predicting duration and energy contours for each phoneme of a text utterance.

Referring to FIGS. 3A-3C, in some implementations, the autoencoder 300 uses the hierarchical linguistic structure 200 to predict a prosodic representation for a given text utterance 320 during inference by jointly predicting durations of phonemes 230 and pitch and/or energy contours for each syllable 240 of the given text utterance 320. Since the text utterance 320 does not provide any context, semantic information, or pragmatic information to indicate an appropriate prosody for the text utterance, the autoencoder 300 selects an utterance embedding 260 as a latent variable to represent an intended prosody for the text utterance 320.

The utterance embedding 260 may be selected from the utterance embedding data storage 180 (FIG. 1). Each utterance embedding 260 in the storage 180 may be encoded by the encoder portion 302 (FIGS. 2A and 2C) from a corresponding variable-length reference audio signal 222 (FIGS. 2A and 2C) during training. Specifically, the encoder portion 302 compresses prosody of variable-length reference audio signals 222 into fixed-length utterance embeddings 260 during training and stores each utterance embedding 260 together with a transcript 261 of the corresponding reference audio signal 222 in the utterance embedding data storage 180 for use by the decoder portion 310 at inference. In the example shown, the autoencoder 300 may first locate utterance embeddings 260 having transcripts 261 that closely match the text utterance 320 and then select one of the utterance embeddings 260 to predict the prosodic representation 322 (FIG. 1) for the given text utterance 320. In some examples, the fixed-length utterance embedding 260 is selected by picking a specific point in a latent space of embeddings 260 that likely represents particular semantics and pragmatics for a target prosody. In other examples, the latent space is sampled to choose a random utterance embedding 260 for representing the intended prosody for the text utterance 320. In yet another example, the autoencoder 300 models the latent space as multidimensional unit Gaussian by choosing a mean of the utterance embeddings 260 having closely matching transcripts 261 for representing a most likely prosody for the linguistic features of the text utterance 320. If the prosody variation of the training data is reasonably neutral, the last example of choosing the mean of utterance embeddings 260 is a reasonable choice.

FIGS. 3A and 3C show the text utterance 320 having three words 250A, 250B, 250C represented in the word level 250 of the hierarchical linguistic structure 200. The first word 250A contains syllables 240Aa, 240Ab, the second word 250B contains one syllable 240Ba, and the third word 250C contains syllables 240Ca, 240Cb. Accordingly, the syllable level 240 of the hierarchical linguistic structure 200 includes a sequence of five syllables 240Aa-240Cb of the text utterance 320. At the syllable level 240 of LTSM processing cells, the autoencoder 300 is configured to produce/output a corresponding syllable embedding 245Aa, 245Ab, 245Ba, 245Ca, 245Cb for each syllable 240 from the following inputs: the fixed-length utterance embedding 260; utterance-level linguistic features 262 associated with the text utterance 320; word-level linguistic features 252 associated with the word 250 that contains the syllable 240; and syllable-level linguistic features 242 for the syllable 240. The utterance-level linguistic features 262 may include, without limitation, whether or not the text utterance 320 is a question, an answer to a question, a phrase, a sentence, etc. The word-level linguistic features 252 may include, without limitation, a word type (e.g., noun, pronoun, verb, adjective, adverb, etc.) and a position of the word in the text utterance 320. The syllable-level linguistic features 242 may include, without limitation, whether the syllable 240 is stressed or unstressed.

In the example shown, each syllable 240Aa, 240Ab, 240Ba, 240Ca, 240Cb in the syllable level 240 may be associated with a corresponding LTSM processing cell that outputs a corresponding syllable embedding 245Aa, 245Ab, 245Ba, 245Ca, 245Cb to the faster clocking phoneme level 230 for decoding the individual fixed-length predicted pitch (F0) frames 280, 280F0 (FIG. 3A) and for decoding the individual fixed-length predicted energy (C0) frames 280, 28000 (FIG. 3C) in parallel. FIG. 3A shows each syllable in the syllable level 240 including a plurality of fixed-length predicted pitch (F0) frames 280F0 that indicate a duration (timing and pauses) and a pitch contour for the syllable 240. Here, the duration and pitch contour correspond to a prosodic representation of the syllable 240. FIG. 3C shows each phoneme in the phoneme level 230 including a plurality of fixed-length predicted energy (C0) frames 280C0 that indicate a duration and an energy contour for the phoneme.

The first syllable 240Aa (i.e., LTSM processing cell Aa) in the syllable level 240 receives the fixed-length utterance embedding 260, utterance-level linguistic features 262 associated with the text utterance 320, word-level linguistic features 252A associated with the first word 250A, and the syllable-level linguistic features 242Aa for the syllable 240Aa as inputs for producing the corresponding syllable embedding 245Aa. The second syllable 240Ab in the syllable level 240 receives the fixed-length utterance embedding 260, the utterance-level linguistic features 262 associated with the text utterance 320, the word-level linguistic features 252A associated with the first word 250A, and corresponding syllable-level linguistic features 242 (not shown) for the syllable 240Ab as inputs for producing the corresponding syllable embedding 245Aa. While the example only shows syllable-level linguistic features 242 associated with the first syllable 240Aa, the corresponding syllable-level linguistic features 242 associated with each other syllable 240Ab-240Cb in the syllable level 240 are only omitted from the views of FIGS. 3A and 3B for the sake of clarity.

For simplicity, the corresponding syllable-level linguistic features 242 input to the processing block for syllable 240Ab are not shown. The LTSM processing cell (e.g., rectangle Ab) associated with the second syllable 240Ab also receives the state of the preceding first syllable 240Aa. The remaining sequence of syllables 240Ba, 240Ca, 240Cb in the syllable level 240 each produce corresponding syllable embeddings 245Ba, 245Ca, 245Cb in a similar manner. For simplicity, the corresponding syllable-level linguistic features 242 input to the processing block for each of the syllables 240Ba, 240Ca, 240Cb are not shown. Moreover, each LTSM processing cell of the syllable level 240 receives the state of the immediately preceding LTSM processing cell of the syllable level 240.

Referring to FIG. 3A, the phoneme level 230 of the hierarchical linguistic structure 200 includes the sequence of nine phonemes 230Aa1-230Cb2 each associated with a corresponding predicted phoneme duration 234. Moreover, the autoencoder 300 encodes the phoneme-level linguistic features 232 associated with each phoneme 230Aa1-230Cb2 with the corresponding syllable embedding 245 for predicting the corresponding predicted phoneme duration 234 and for predicting the corresponding pitch (f0) contour for the syllable containing the phoneme. The phoneme-level linguistic features 232 may include, without limitation, an identity of sound for the corresponding phoneme 230. While the example only shows phoneme-level linguistic features 232 associated with the first phoneme 230Aa1, the phoneme-level linguistic features 232 associated with the other phonemes 230Aa2-230Cb2 in the phoneme level 230 are only omitted from the views of FIGS. 3A and 3C for the sake of clarity.

The first syllable 240Aa contains phonemes 230Aa1, 230Aa2 and includes a predicted syllable duration equal to the sum of the predicted phone durations 234 for the phonemes 230Aa1, 230Aa2. Here, the predicted syllable duration for the first syllable 240Aa determines the number of fixed-length predicted pitch (F0) frames 280F0 to decode for the first syllable 240Aa. In the example shown, the autoencoder 300 decodes a total of seven fixed-length predicted pitch (F0) frames 280F0 for the first syllable 240Aa based on the sum of the predicted phoneme durations 234 for the phonemes 230Aa1, 230Aa2. Accordingly, the faster clocking syllable layer 240 distributes the first syllable embedding 245Aa as an input to each phoneme 230Aa1, 230Aa2 included in the first syllable 240Aa. A timing signal may also be appended to the first syllable embedding 245Aa. The syllable level 240 also passes the state of the first syllable 240Aa to the second syllable 240Ab.

The second syllable 240Ab contains a single phoneme 230Ab1 and therefore includes a predicted syllable duration equal to the predicted phoneme duration 234 for the phoneme 230Ab1. Based on the predicted syllable duration for the second syllable 240Ab, the autoencoder 300 decodes a total of four fixed-length predicted pitch (F0) frames 280F0 for the second syllable 240Ab. Accordingly, the faster clocking syllable layer 240 distributes the second syllable embedding 245Ab as an input to the phoneme 230Ab1. A timing signal may also be appended to the second syllable embedding 245Aa. The syllable level 240 also passes the state of the second syllable 240Ab to the third syllable 240Ba.

The third syllable 240Ba contains phonemes 230Ba1, 230Ba2, 230Ba3 and includes a predicted syllable duration equal to the sum of the predicted phoneme durations 234 for the phonemes 230Ba1, 230Ba2, 230Ba3. In the example shown, the autoencoder 300 decodes a total of eleven fixed-length predicted pitch (F0) frames 280F0 for the third syllable 240Ba based on the sum of the predicted phoneme durations 234 for the phonemes 230Ba1, 230Ba2, 230Ba3. Accordingly, the faster clocking syllable layer 240 distributes the third syllable embedding 245Ba as an input to each phoneme 230Ba1, 230Ba2, 230Ba3 included in the third syllable 240Ba. A timing signal may also be appended to the third syllable embedding 245Ba. The syllable level 240 also passes the state of the third syllable 240Ba to the fourth syllable 240Ca.

The fourth syllable 240Ca contains a single phoneme 230Ca1 and therefore includes a predicted syllable duration equal to the predicted phoneme duration 234 for the phoneme 230Ca1. Based on the predicted syllable duration for the fourth syllable 240Ca, the autoencoder 300 decodes a total of three fixed-length predicted pitch (F0) frames 280F0 for the fourth syllable 240Ca. Accordingly, the faster clocking syllable layer 240 distributes the fourth syllable embedding 245Ca as an input to the phoneme 230Ca1. A timing signal may also be appended to the fourth syllable embedding 245Ca. The syllable level 240 also passes the state of the fourth syllable 240Ba to the fifth syllable 240Cb.

Lastly, the fifth syllable 240Cb contains phonemes 230Cb1, 230Cb2 and includes a predicted syllable duration equal to the sum of the predicted phoneme durations 234 for the phonemes 230Cb1, 230Cb2. In the example shown, the autoencoder 300 decodes a total of six fixed-length predicted pitch (F0) frames 280F0 for the fifth syllable 240Cb based on the sum of the predicted phoneme durations 234 for the phonemes 230Cb1, 230Cb2. Accordingly, the faster clocking syllable layer 240 distributes the fifth syllable embedding 245Cb as an input to each phoneme 230Cb1, 230Cb2 included in the fifth syllable 240Cb. A timing signal may also be appended to the fifth syllable embedding 245Cb.

FIG. 3B provides a detailed view within dashed box 350 of FIG. 3A to show the decoding of the first syllable embedding 245Aa into individual fixed-length predicted pitch (F0) frames 280F0 for the first syllable 240Aa. As set forth above with reference to FIG. 3A, the autoencoder 300 determines the number of fixed-length predicted pitch (F0) frames 280 to decode based on the predicted syllable duration for the first syllable 240Aa. The first syllable 240Aa generates the corresponding first syllable embedding 245Aa for distribution as an input to each of the first and second phonemes 230Aa1, 230Aa2 of the faster clocking syllable level 240.

At the phoneme level 230 of the hierarchical linguistic structure 200, the autoencoder 300 predicts the phoneme duration 234 for the first phoneme 230Aa1 by encoding the phoneme-level linguistic features 232 associated with the first phoneme 230Aa1 with the first syllable embedding 245Aa. Likewise, the autoencoder 300 predicts the phoneme duration 234 for the second phoneme 230Aa2 by encoding the phoneme-level linguistic features (not shown) associated with the second phoneme 230Aa2 with the first syllable embedding 245Aa. The second phoneme 230Aa2 also receives the previous state from the first phoneme 230Aa1. The predicted syllable duration for the first syllable 230Aa is equal to the sum of the predicted phone durations 234 for the first and second phonemes 230Aa1, 230Aa2. The encodings of the first syllable embedding 245Aa with the corresponding phoneme-level linguistic features 232 associated with each of the phonemes 230Aa1, 230Aa2 is further combined with the first syllable embedding 245Aa at the output of the phoneme level 230 to predict the pitch (F0) for the first syllable 240Aa and generate the fixed-length predicted pitch (F0) frames 280F0 for the first syllable 240Aa. In the example shown, the autoencoder 300 determines the total number (e.g., seven) of fixed-length predicted pitch (F0) frames 280F0 to decode/generate based on the predicted syllable duration for the first syllable 240Aa. Thus, the fixed-length predicted pitch (F0) frames 280 decoded from the first syllable embedding 245Aa collectively indicate a corresponding duration and pitch contour for the first syllable 240Aa of the text utterance 320.

Referring back to FIG. 3A, the autoencoder 300 similarly decodes each of the remaining syllable embeddings 245Ab, 245Ba, 245Ca, 245Cb output from the syllable level 240 into individual fixed-length predicted pitch (F0) frames 280 for each corresponding syllable 240Ab, 240Ba, 240Ca, 240Cb. For instance, the second syllable embedding 245Ab is further combined at the output of the phoneme level 230 with the encoding of the second syllable embedding 245Ab and the corresponding phoneme-level linguistic features 232 associated with the phoneme 230Ab1, while the third syllable embedding 245Ba is further combined at the output of the phoneme level 230 with the encodings of the third syllable embedding 245Ba and the corresponding phoneme-level linguistic features 232 associated with each of the phonemes 230Ba1, 230Ba2, 230Ba3. Moreover, the fourth syllable embedding 245Ca is further combined at the output of the phoneme level 230 with the encodings of the fourth syllable embedding 245Ca and the corresponding phoneme-level linguistic features 232 associated with the phoneme 230Ca1, while the fifth syllable embedding 245Cb is further combined at the output of the phoneme level 230 with the encodings of the fifth syllable embedding 245Cb and the corresponding phoneme-level linguistic features 232 associated with each of the phonemes 230Cb1, 230Cb2. While the fixed-length predicted pitch (F0) frames 280F0 generated by the autoencoder 300 include frame-level LSTM, other configurations may replace the frame-level LSTM of pitch (F0) frames 280F0 with a feed-forward layer so that the pitch (F0) of every frame in a corresponding syllable is predicted in one pass.

Referring now to FIG. 3C, the autoencoder 300 is further configured to encode the phoneme-level linguistic features 232 associated with each phoneme 230Aa1-230Cb2 with the corresponding syllable embedding 245 for predicting the corresponding energy (C0) contour for each phoneme 230. The phoneme-level linguistic features 232 associated with phonemes 230Aa2-230Cb2 in the phoneme level 230 are only omitted from the view of FIG. 3C for the sake of clarity. The autoencoder 300 determines the number of fixed-length predicted energy (C0) frames 280, 28000 to decode for each phoneme 230 based on the corresponding predicted phoneme duration 234. For instance, the autoencoder 300 decodes/generates four (4) predicted energy (C0) frames 28000 for the first phoneme 230Aa1, three (3) predicted energy (C0) frames 28000 for the second phoneme 230Aa2, four (4) predicted energy (C0) frames 28000 for the third phoneme 230Ab1, two (2) predicted energy (C0) frames 28000 for the fourth phoneme 230Ba1, five (5) predicted energy (C0) frames 28000 for the fifth phoneme 230Ba2, four (4) predicted energy (C0) frames 28000 for the sixth phoneme 230Ba3, three (3) predicted energy (C0) frames 28000 for the seventh phoneme 230Ca1, four (4) predicted energy (C0) frames 28000 for the eighth phoneme 230Cb1, and two (2) predicted energy (C0) frames 28000 for the ninth phoneme 230Cb2. Accordingly, as with the predicted phoneme duration 234, the predicted energy contour for each phoneme in the phoneme level 230 is based on an encoding between the syllable embedding 245 input from the corresponding syllable in the slower clocking syllable level 240 that contains the phoneme and the linguistic features 232 associated with the phoneme.

Figure 4:
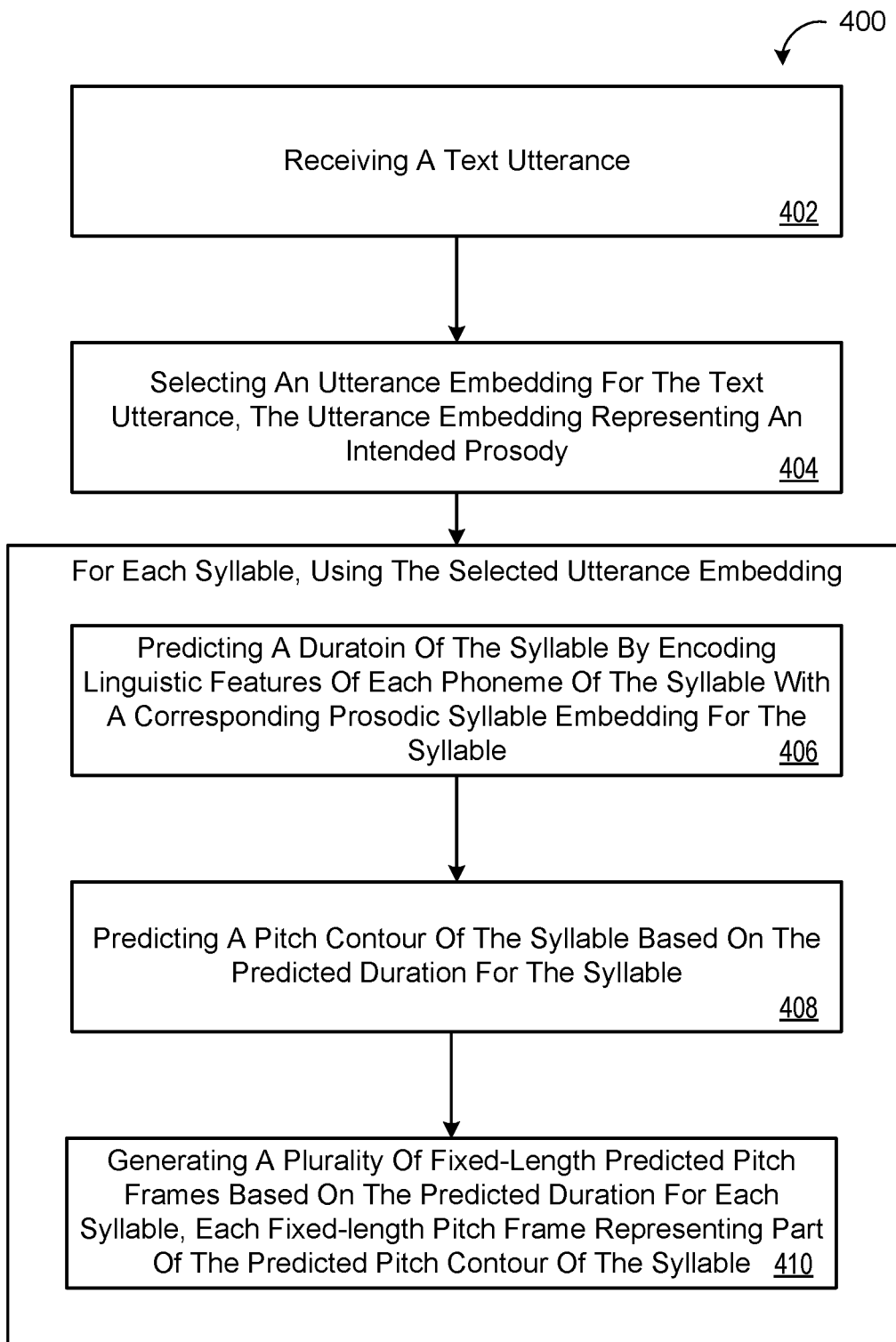
FIG. 4 is a flowchart of an example arrangement of operations for a method of predicting a prosodic representation of a received text utterance.

FIG. 4 is a flow chart of an example arrangement of operations for a method 400 of predicting a prosodic representation 322 for a text utterance 320. The method 400 may be described with reference to FIGS. 1-3C. The memory hardware 124 residing on the computer system 120 of FIG. 1 may store instructions that when executed by the data processing hardware 122 cause the data processing hardware 122 to execute the operations for the method 400. At operation 402, the method 400 includes receiving the text utterance 320. The text utterance 320 has at least one word, each word having at least one syllable, each syllable having at least one phoneme. At operation 404, the method 400 includes selecting an utterance embedding 260 for the text utterance 320. The utterance embedding 260 represents an intended prosody. As used herein, the selected utterance embedding 260 is used to predict the prosodic representation 322 of the text utterance 320 for use by a TTS system 150 to produce synthesized speech 152 from the text utterance 320 and having the intended prosody. The utterance embedding 260 may be represented by a fixed-length numerical vector. The numerical vector may include a value equal to "256". To select the utterance embedding 260 for the text utterance 230, the data processing hardware 122 may first query the data storage 180 to locate utterance embeddings 260 having transcripts 261 that closely match the text utterance 320 and then select the utterance embeddings 260 to predict the prosodic representation 322 for the given text utterance 320. In some examples, the fixed-length utterance embedding 260 is selected by picking a specific point in a latent space of embeddings 260 that likely represents particular semantics and pragmatics for a target prosody. In other examples, the latent space is sampled to choose a random utterance embedding 260 for representing the intended prosody for the text utterance 320. In yet another example, the data processing hardware 122 models the latent space as multidimensional unit Gaussian by choosing a mean of the utterance embeddings 260 having closely matching transcripts 261 for representing a most likely prosody for the linguistic features of the text utterance 320. If the prosody variation of the training data is reasonably neutral, the last example of choosing the mean of utterance embeddings 260 is a reasonable choice At operation 406, for each syllable 240, using the selected utterance embedding 260, the method 400 includes predicting a duration of the syllable by encoding linguistic features 232 of each phoneme 230 of the syllable with a corresponding prosodic syllable embedding 245 for the syllable. For instance, for each phoneme 230 associated with the syllable 240, the method 400 may predict a duration 234 of the corresponding phoneme 230 by encoding the linguistic features 232 of the corresponding phoneme 230 with the corresponding prosodic syllable embedding 245 for the syllable 240. Thereafter, the method 400 may predict the duration of the syllable 240 by summing the predicted durations 234 for each phoneme 230 associated with the syllable 240.

At operation 408, for each syllable 240, using the selected utterance embedding 260, the method 400 includes predicting a pitch contour of the syllable based on the predicted duration for the syllable. At operation 410, for each syllable, using the selected utterance embedding 260, the method 400 also includes generating a plurality of fixed-length predicted pitch frames 280, 280F0 based on the predicted duration for the syllable 240. Each fixed-length predicted pitch frame 280F0 represents part of the predicted contour of the syllable 240.

Additional operations for the method 400 may further include, for each syllable 240, using the selected utterance embedding 260, predicting an energy contour of each phoneme 230 in the syllable 240 based on a predicted duration 234 for the corresponding phoneme 230. For each phoneme 230 associated with the syllable, the method 400 may generate a plurality of fixed-length predicted energy frames 280, 280O0 based on the predicted duration 234 for the corresponding phoneme 230. Here, each fixed-length energy frame 280O0 represents the predicted energy contour of the corresponding phoneme 230.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
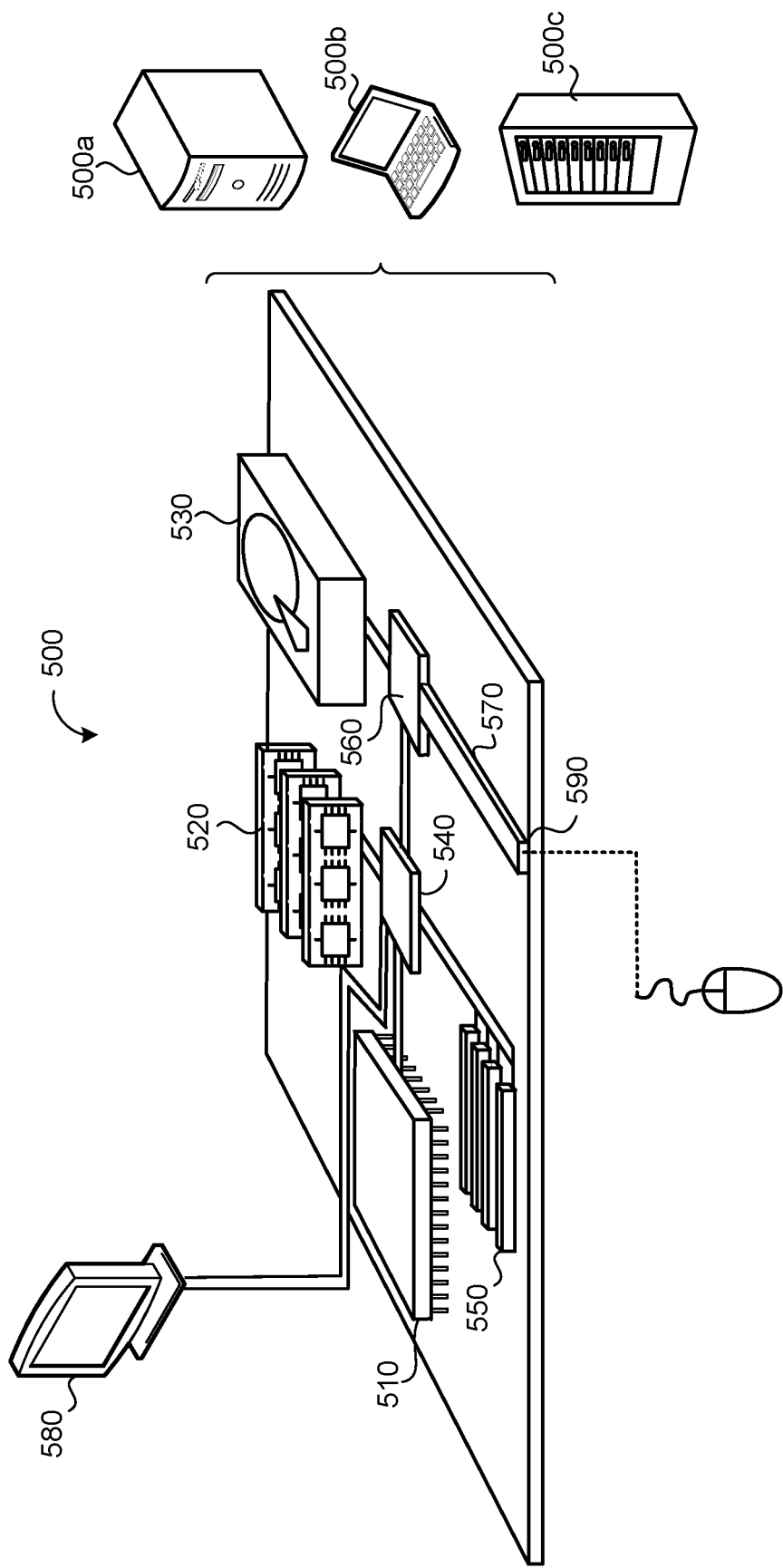
FIG. 5 is a schematic view of an example computing device that may be used to implement the systems and methods described herein.

FIG. 5 is schematic view of an example computing device 500 (e.g., computing system 120 of FIG. 1) that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., data processing hardware 122 of FIG. 1)) can process instructions for execution within the computing device 500, including instructions stored in the memory 520 (e.g., memory hardware 124 of FIG. 1) or on the storage device 530 (e.g., memory hardware 124 of FIG. 1) to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a text utterance having at least one word, each word having at least one syllable, each syllable having at least one phoneme;
   selecting, by the data processing hardware, an utterance embedding for the text utterance, the utterance embedding representing an intended prosody; and
   for each syllable, using the selected utterance embedding:
      predicting, by the data processing hardware, a duration of the syllable by encoding linguistic features of each phoneme of the syllable with a corresponding prosodic syllable embedding for the syllable;
      predicting, by the data processing hardware, a pitch contour of the syllable based on the predicted duration for the syllable; and
      generating, by the data processing hardware, a plurality of fixed-length predicted pitch frames based on the predicted duration for the syllable, each fixed-length predicted pitch frame representing part of the predicted pitch contour of the syllable.

2. The method of claim 1, wherein a network representing a hierarchical linguistic structure of the text utterance comprises:
   a first level including each syllable of the text utterance;
   a second level including each phoneme of the text utterance; and
   a third level including each fixed-length predicted pitch frame for each syllable of the text utterance.

3. The method of claim 2, wherein:
the first level of the network representing the hierarchical linguistic structure comprises a long short-term memory (LSTM) processing cell representing each syllable of the text utterance;
the second level of the network representing the hierarchical linguistic structure comprises a LSTM processing cell representing each phoneme of the text utterance, the LSTM processing cells of the second level clocking relative to and faster than the LSTM processing cells of the first level; and
the third level of the network representing the hierarchical linguistic structure comprises a LSTM processing cell representing each fixed-length predicted pitch frame, the LSTM processing cells of the third level clocking relative to and faster than the LSTM processing cells of the second level.

4. The method of claim 1, wherein predicting the duration of the syllable comprises:
for each phoneme associated with the syllable, predicting a duration of the corresponding phoneme by encoding the linguistic features of the corresponding phoneme with the corresponding prosodic syllable embedding for the syllable; and
determining the duration of the syllable by summing the predicted durations for each phoneme associated with the syllable.

5. The method of claim 4, wherein predicting the pitch contour of the syllable based on the predicted duration for the syllable comprises combining the corresponding prosodic syllable embedding for the syllable with each encoding of the corresponding prosodic syllable embedding and the phone-level linguistic features of each corresponding phoneme associated with the syllable.

6. The method of claim 1, further comprising, for each syllable, using the selected utterance embedding:
predicting, by the data processing hardware, an energy contour of each phoneme in the syllable based on a predicted duration for the phoneme; and
for each phoneme associated with the syllable, generating, by the data processing hardware, a plurality of fixed-length predicted energy frames based on the predicted duration for the corresponding phoneme, each fixed-length energy frame representing the predicted energy contour of the corresponding phoneme.

7. The method of claim 6, wherein a hierarchical linguistic structure represents the text utterance, the hierarchical linguistic structure comprising:
a first level including each syllable of the text utterance;
a second level including each phoneme of the text utterance;
a third level including each fixed-length predicted pitch frame for each syllable of the text utterance; and
a fourth level parallel to the third level and including each fixed-length predicted energy frame for each phoneme of the text utterance.

8. The method of claim 7, wherein:
the first level of the hierarchical linguistic structure comprises a long short-term memory (LSTM) processing cell representing each syllable of the text utterance;
the second level of the hierarchical linguistic structure comprises a LSTM processing cell representing each phoneme of the text utterance, the LSTM processing cells of the second level clocking relative to and faster than the LSTM processing cells of the first level;
the third level of the hierarchical linguistic structure comprises a LSTM processing cell representing each fixed-length predicted pitch frame, the LSTM processing cells of the third level clocking relative to and faster than the LSTM processing cells of the second level; and
the fourth level of the hierarchical linguistic structure comprises a LSTM processing cell representing each fixed-length predicted energy frame, the LSTM processing cells of the fourth level clocking at the same speed as the LSTM processing cells of the third level and clocking relative to and faster than the LSTM processing cells of the second level.

9. The method of claim 7, wherein:
the third level of the hierarchical linguistic structure comprises a feed-forward layer that predicts the predicted pitch frames for each syllable in a single pass; and/or
the fourth level of the hierarchical linguistic structure comprises a feed-forward layer that predicts the predicted energy frames for each phoneme in a single pass.

10. The method of claim 6, wherein the lengths of the fixed-length predicted energy frames and the fixed-length predicted pitch frames are the same.

11. The method of claim 6, wherein a total number of fixed-length predicted energy frames generated for each phoneme of the received text utterance is equal to a total number of the fixed-length predicted pitch frames generated for each syllable of the received text utterance.

12. The method of claim 1, wherein the utterance embedding comprises a fixed-length numerical vector.

13. The method of claim 1, further comprising:
receiving, by the data processing hardware, training data including a plurality of reference audio signals, each reference audio signal comprising a spoken utterance of human speech and having a corresponding prosody; and
training, by the data processing hardware, a deep neural network for a prosody model by encoding each reference audio signal into a corresponding fixed-length utterance embedding representing the corresponding prosody of the reference audio signal.

14. A system comprising:
data processing hardware; and
memory hardware in communication with the data processing hardware, the memory hardware storing instructions that when executed on the data processing hardware cause the data processing hardware to perform operations comprising:
receiving a text utterance having at least one word, each word having at least one syllable, each syllable having at least one phoneme;
selecting an utterance embedding for the text utterance, the utterance embedding representing an intended prosody; and
for each syllable, using the selected utterance embedding:
predicting a duration of the syllable by encoding linguistic features of each phoneme of the syllable with a corresponding prosodic syllable embedding for the syllable;
predicting a pitch contour of the syllable based on the predicted duration for the syllable; and
generating a plurality of fixed-length predicted pitch frames based on the predicted duration for the syllable, each fixed-length predicted pitch frame representing part of the predicted pitch contour of the syllable.

15. The system of claim 14, wherein a network representing a hierarchical linguistic structure of the text utterance comprises:
- a first level including each syllable of the text utterance;
- a second level including each phoneme of the text utterance; and
- a third level including each fixed-length predicted pitch frame for each syllable of the text utterance.

16. The system of claim 15, wherein:
- the first level of the network representing the hierarchical linguistic structure comprises a long short-term memory (LSTM) processing cell representing each syllable of the text utterance;
- the second level of the network representing the hierarchical linguistic structure comprises a LSTM processing cell representing each phoneme of the text utterance, the LSTM processing cells of the second level clocking relative to and faster than the LSTM processing cells of the first level; and
- the third level of the network representing the hierarchical linguistic structure comprises a LSTM processing cell representing each fixed-length predicted pitch frame, the LSTM processing cells of the third level clocking relative to and faster than the LSTM processing cells of the second level.

17. The system of claim 14, wherein predicting the duration of the syllable comprises:
- for each phoneme associated with the syllable, predicting a duration of the corresponding phoneme by encoding the linguistic features of the corresponding phoneme with the corresponding prosodic syllable embedding for the syllable; and
- determining the duration of the syllable by summing the predicted durations for each phoneme associated with the syllable.

18. The system of claim 17, wherein predicting the pitch contour of the syllable based on the predicted duration for the syllable comprises combining the corresponding prosodic syllable embedding for the syllable with each encoding of the corresponding prosodic syllable embedding and the phone-level linguistic features of each corresponding phoneme associated with the syllable.

19. The system of claim 14, wherein the operations further comprise, for each syllable, using the selected utterance embedding:
- predicting an energy contour of each phoneme in the syllable based on a predicted duration for the corresponding phoneme; and
- for each phoneme associated with the syllable, generating a plurality of fixed-length predicted energy frames based on the predicted duration for the corresponding phoneme, each fixed-length energy frame representing the predicted energy contour of the corresponding phoneme.

20. The system of claim 19, wherein a hierarchical linguistic structure represents the text utterance, the hierarchical linguistic structure comprising:
- a first level including each syllable of the text utterance;
- a second level including each phoneme of the text utterance;
- a third level including each fixed-length predicted pitch frame for each syllable of the text utterance; and
- a fourth level parallel to the third level and including each fixed-length predicted energy frame for each phoneme of the text utterance.

21. The system of claim 20, wherein:
- the first level of the hierarchical linguistic structure comprises a long short-term memory (LSTM) processing cell representing each syllable of the text utterance;
- the second level of the hierarchical linguistic structure comprises a LSTM processing cell representing each phoneme of the text utterance, the LSTM processing cells of the second level clocking relative to and faster than the LSTM processing cells of the first level;
- the third level of the hierarchical linguistic structure comprises a LSTM processing cell representing each fixed-length predicted pitch frame, the LSTM processing cells of the third level clocking relative to and faster than the LSTM processing cells of the second level; and
- the fourth level of the hierarchical linguistic structure comprises a LSTM processing cell representing each fixed-length predicted energy frame, the LSTM processing cells of the fourth level clocking at the same speed as the LSTM processing cells of the third level and clocking relative to and faster than the LSTM processing cells of the second level.

22. The system of claim 20, wherein:
- the third level of the hierarchical linguistic structure comprises a feed-forward layer that predicts the predicted pitch frames for each syllable in a single pass; and/or
- the fourth level of the hierarchical linguistic structure comprises a feed-forward layer that predicts the predicted energy frames for each phoneme in a single pass.

23. The system of claim 19, wherein the lengths of the fixed-length predicted energy frames and the fixed-length predicted pitch frames are the same.

24. The system of claim 19, wherein a total number of fixed-length predicted energy frames generated for each phoneme of the received text utterance is equal to a total number of the fixed-length predicted pitch frames generated for each syllable of the received text utterance.

25. The system of claim 14, wherein the utterance embedding comprises a fixed-length numerical vector.

26. The system of claim 14, wherein the operations further comprise:
- receiving training data including a plurality of reference audio signals, each reference audio signal comprising a spoken utterance of human speech and having a corresponding prosody; and
- training a deep neural network for a prosody model by encoding each reference audio signal into a corresponding fixed-length utterance embedding representing the corresponding prosody of the reference audio signal.

* * * * *